United States Patent Office 3,098,751
Patented July 23, 1963

3,098,751
PRINTING INK COMPOSITION FOR ETHYLENE OXIDE STERILIZATION INDICATORS
Willard M. Huyck, Woodland Hills, and Vincent A. Romito, North Hollywood, Calif., assignors to Aseptic Thermo Indicator Company, North Hollywood, Calif., a corporation of California
No Drawing. Filed July 18, 1960, Ser. No. 43,320
3 Claims. (Cl. 106—20)

This invention relates to a composition for an ink for printing telltale insignia on paper or the like to visually indicate that a required concentration of ethylene oxide has been applied for the necessary time to insure sterilization within a treating vessel or within the contents of a package subjected to gas treatment therein.

The principal object of the invention is to provide an ink for printing telltale insignia which will show whether or not treated materials have been subjected to sterilizing conditions using ethylene oxide as the sterilizing medium.

Another object is to provide a printed telltale device for ethylene oxide sterilization which is inexpensive, simple to use, and is entirely free from any danger of contaminating the goods being sterilized.

The efficacy of sterilization by ethylene oxide of goods such as foodstuffs, seeds, grains, bandages, instruments, (particularly plastic instruments which will not withstand heat sterilization) and the like, depends upon a number of factors, the most important of which are the concentration of the ethylene oxide in the sterilizing vessel, the moisture present, the time of contact with the ethylene oxide, and the temperature of the treatment. Since one of the principal advantages of ethylene oxide sterilization is that it is effective at relatively low temperatures, most sterilizers are operated at ambient temperatures up to about 145° F. Humidity in the range from 40 to 60 percent relative humidity has been found to be most effective, and in practice this range can be maintained. The effects of time and concentration are inter-related and generally expressed as the lower the concentration, the longer time of exposure required to effect sterilization.

The telltales of this invention measure the integrated effect of time of exposure, and the concentration of the ethylene oxide, in the presence of water vapor. The telltales depend upon the chemical reaction of ethylene oxide on magnesium chloride, crystallized with water,

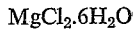

by which magnesium hydroxide and epichlorohydrin are produced.

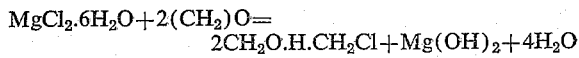

When a known amount of acid is initially added to the composition, a known minimum amount of ethylene oxide will have been absorbed and reacted with the acid when the mass becomes alkaline, after exposure to moist ethylene oxide. This alkalinity is visually shown when an alkali-acid dye indicator in the composition changes color, for example, a sodium salt of brom-phenol changes to purple when alkaline from the color yellow when the composition is acid.

We have discovered that these reactions can be utilized when the composition is in the form of a dried printing ink which is applied by the processes of printing, particularly by flexographic printing of spots or other insignia, on paper or other sheeted material. The freshly applied spots or insignia are allowed to dry, after which the printed indicators are used as telltales to indicate that moist ethylene oxide has been present in sufficient concentration for a long enough time to effectively sterilize the goods or articles contained in the sterilizing vessel.

Essentially the indicator ink of this invention consists of a thickened liquid ink base, powdered magnesium chloride with water of crystallization ($MgCl_2 \cdot 6H_2O$), and a pH dye indicator. Flexographic type ink, which dries rapidly by evaporation, is preferred. Flexographic inks consist generally of (1) a vehicle or carrier-resin dissolved in a fast evaporating solvent, and (2) a pigment or dye. In this adaptation of a flexographic ink, a third ingredient, a reactant with ethylene oxide and moisture is also included, this being the water crystallized magnesium chloride ($MgCl_2 \cdot 6H_2O$). A fourth ingredient is the acidic material which reacts with the alkali liberated when ethylene oxide reacts with the magnesium chloride, as described above. The dye normally used in the flexographic ink, for the purposes of this invention, is an acid-alkali indicator dye of the general nature of bromphenol blue, and a white pigment is also preferably used with the indicator dye to enhance the color change.

Example A

A typical flexographic ink composition which, when printed out on paper or the like and "dried," will qualitatively indicate the presence of moist ethylene oxide, would contain, in parts by weight:

1000 Standard solvent Socal #1
200 ethyl cellulose (viscosity 50 cps.)
25 polyethylene (Semet Solvay Petrochemical Div., Allied Chemical & Dye Corp. "A.C. No. 6")
75 powdered $MgCl_2 \cdot 6H_2O$
1 sodium salt of "Bromphenol Blue" (tetrabromophenol-sulphon-phthalein)

Insignia printed from the above composition, on 30 pound bleached kraft paper will change from yellow to blue when exposed to a concentration of 900 mg. per liter of ethylene oxide, at 30 to 80 percent relative humidity, for 5 to 10 minutes.

Powdered citric acid may be used to delay this indicator ink. For each 10 percent by weight addition (based upon the composition of Example A) of citric acid, the time of changing from yellow to blue is delayed by 30 minutes. It is thus possible to provide a printing ink from which telltale insignia may be printed which indicate exposures to ethylene oxide gas containing moisture for time periods from 5 to 10 minutes to several hours. After the time of exposure for desired or satisfactory sterilization has been ascertained (by the usual bacteriological tests), it is then only necessary to select the printing ink having the correct amount of citric acid to correspond to the selected sterilization time.

Other thickened-liquid printing ink base compositions may also be used. Ethyl cellulose is the preferred resin because of its better storage life, but other cellulose ether materials may be used alone or in combination. Polyethylene is preferably added because it seems to improve the shelf life of the indicators.

Modified alkyd resins (for example, Archer Daniels Midland Co. Arachem 404) or zein (for example Corn Products Co. Zein G–200, or corn derived protein resin) may be used in place of the cellulose ethers.

The liquid should be a solvent for the selected resin carrier. For ethyl cellulose, this includes methylene dichloride, benzene, toluene, ethyl alcohol, methyl alcohol, aromatic hydrocarbons, and chlorinated hydrocarbons.

The composition above shown as Example A may be varied within the indicated range of proportions, to attain similar results to those described. In parts by weight:

800–1000 Standard solvent Socal #1
150–200 ethyl cellulose (viscosity 50 cps.)
25–50 polyethylene (Semet-Solvay Petrochemical Div., Allied Chemical & Dye Corp. "A.C. No. 6")
50–75 powdered $MgCl_2 \cdot 6H_2O$ 1-2 sodium salt of "Bromphenol Blue" (tetrabromo-phenol-sulphon-phthalein)

All of the printing ink compositions detailed above may be improved by the addition of about 3 to 5 percent of an inert bright white pigment such as titanium oxide, which brightens and augments the color effects of the pH indicator.

Other well known pH indicators in addition to the preferred bromphenol blue (tetrabromophenol-sulphon-phthalein) may be used. Methyl red, which changes color sharply when an acid solution approaches the neutral (pH 7) point is satisfactory.

*Example B*

Another illustrative composition for our indicator ink consists of 60 grams methyl cellulose ("Methocel 60 HG," viscosity 50 cps.)
800 ml. methyl alcohol
500 ml. methylene dichloride
75 grams $MgCl_2.6H_2O$
25 ml. hydrochloric acid (10 Normal)
1 gram "Bromphenol Blue" sodium salt
100 grams titanium dioxide pigment
75 grams citric acid The above composition, after grinding in a pebble mill for 24 hours, when applied to 30 pound bleached sulphate paper, and dried, will turn from yellow to blue in 1.5 hours when exposed to a concentration of 450 mg. per liter ethylene oxide gas containing water vapor. When the citric acid is doubled, the time is increased to 3 hours for a color change.

*Example C*

Another composition for an indicator ink consists of 12 grams methyl cellulose (Methocel H.G. 50 cps.)
100 ml. methyl alcohol
200 ml. resin (Archer Daniels Midland Co. "Arolon 304")
75 grams $MgCl_26H_2O$ dissolved in 400 ml. methyl alcohol
1 gram "Bromphenol Blue" sodium salt dissolved in 100 ml. methyl alcohol
100 ml. hydrochloric acid (10 Normal)

When printed by flexographic press methods this ink changes color in 15 minutes when exposed to ethylene oxide gas of concentration of 450 mg. per liter and containing moisture.

The printed insignia may be printed using the indicator ink compositions of this invention, on paper bags or envelopes which contain surgical or dental instruments, or materials to be sterilized with moist ethylene oxide, and the color change of the insignia, printed from the selected ink composition corresponding to the desired degree of sterilization, gives visual assurance that the package has been sterilized. The insignia may also be printed on plain or pressure sensitive tapes which may be then used for holding together bandages or packages of material for ethylene oxide sterilization.

We claim:

1. A composition for printing telltale insignia indicating that selected sterilizing conditions of ethylene oxide concentration, moisture concentration, temperature and time had been attained, consisting essentially of a flexographic printing ink base including a thickener ingredient and a solvent ingredient in proportions to give a practicable ink substance in a flexographic printing process; 3 to 5 percent (based on the ink base) of powdered crystallized magnesium chloride ($MgCl_2.6H_2O$); and a pH indicator in a small but adequate amount to visibly show a change from acidity to alkalinity in said printing when dried, followed by exposure to ethylene oxide in the presence of water vapor.

2. A composition as defined in claim 1 to which citric acid has been added as a retarder ingredient.

3. A composition as defined in claim 1 to which is added about 4% of an inert white pigment.

References Cited in the file of this patent

UNITED STATES PATENTS

| | | |
|---|---|---|
| 2,118,144 | Berman et al. | May 24, 1938 |
| 2,200,069 | Lubs et al. | May 7, 1940 |
| 2,606,654 | Davis et al. | Aug. 12, 1952 |
| 2,928,717 | Eberl et al. | Mar. 15, 1960 |

OTHER REFERENCES

Phillips et al.: "The Sterilizing Action of Gaseous Ethylene Oxide," Amer. Journal of Hygiene, 1949, vol. 50, pages 270–279.

Sudendorf et al.: "Ethylene Oxide (T-gas) and Its Use for Pest Control in Food Products," II, Chemiker-Zeitung, vol. 55, 1931, pages 570–572.